United States Patent [19]  
Jenkins et al.

[11] Patent Number: 4,927,072  
[45] Date of Patent: May 22, 1990

[54] MAILER

[75] Inventors: Richard A. Jenkins, Wheeling; Wilbur P. Hutchinson, Mount Prospect, both of Ill.

[73] Assignee: Moore Business Forms, Inc., Grand Island, N.Y.

[21] Appl. No.: 230,916

[22] Filed: Aug. 11, 1988

Related U.S. Application Data

[63] Continuation-in-part of Ser. No. 911,425, Sep. 25, 1986, abandoned.

[51] Int. Cl.⁵ ..................... B65D 27/10; B65D 27/34
[52] U.S. Cl. .................................. 229/92.3; 229/69; 229/92.1; 282/11.5 A; 206/610
[58] Field of Search ................ 229/92.1, 92.3, 69, 229/71, 68 R, 92, 70, 92.8; 282/11.5 R, 11.5 A, 12 R; 206/610

[56] References Cited

U.S. PATENT DOCUMENTS

| | | | |
|---|---|---|---|
| 3,248,237 | 2/1969 | Dowen | 229/73 |
| 3,606,138 | 9/1971 | Allison | 229/70 |
| 4,199,630 | 4/1980 | Consiglio | 229/69 |
| 4,375,868 | 3/1983 | Slotar et al. | 229/92.3 |
| 4,575,121 | 3/1986 | Conti | 229/69 |
| 4,598,860 | 7/1986 | Pennock | 229/69 |

FOREIGN PATENT DOCUMENTS

| | | | |
|---|---|---|---|
| 0128738 | 12/1984 | European Pat. Off. | |
| 2805736 | 8/1978 | Fed. Rep. of Germany | 229/92.1 |
| 393100 | 12/1908 | France | 229/70 |
| 95705 | 6/1971 | France | |
| 2431919 | 3/1980 | France | 229/69 |
| 2529833 | 1/1984 | France | 282/11.5 A |
| 0128738 | 12/1984 | France | |
| 11375 | of 1892 | United Kingdom | 229/92.1 |

Primary Examiner—Stephen P. Garbe  
Assistant Examiner—Jes F. Pascua  
Attorney, Agent, or Firm—Nixon & Vanderhye

[57] ABSTRACT

An envelope comprising a sheet of paper or the like which is folded along one foldline and then folded along a second foldline perpendicular to the first line to provide an envelope with an address viewable through a window but wherein an insert in the envelope cannot move to and obscure the view of the address through the window. One embodiment includes a return envelope made up of a portion of the aforesaid sheet and a second sheet which overlies said portion of the first sheet. Another embodiment provides a mailer without a viewing window and which is formed from a single ply foldable about orthogonally related foldlines and heat sealable along its edges to form a four-ply mailer.

6 Claims, 7 Drawing Sheets

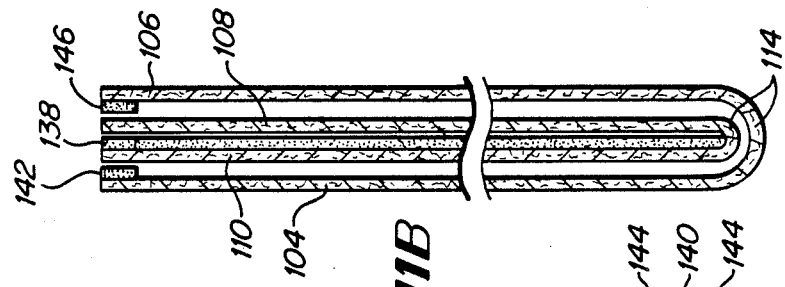
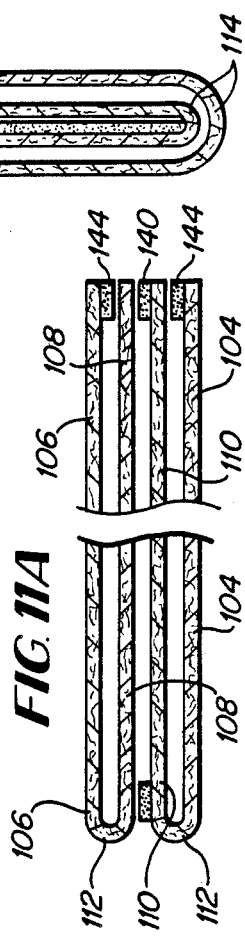
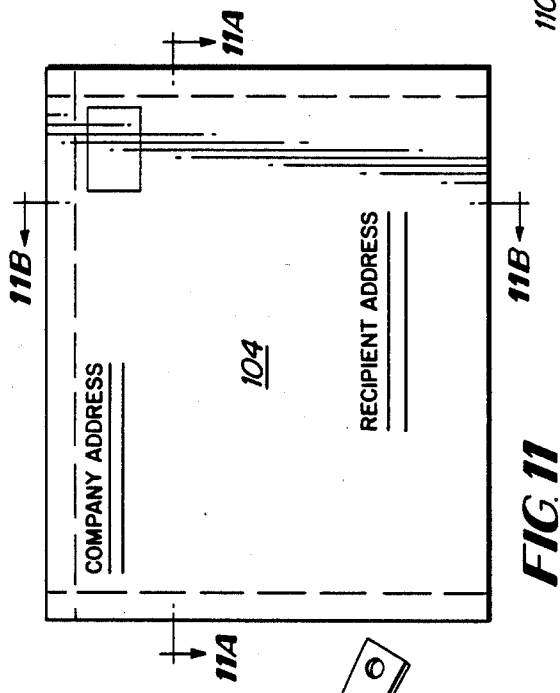
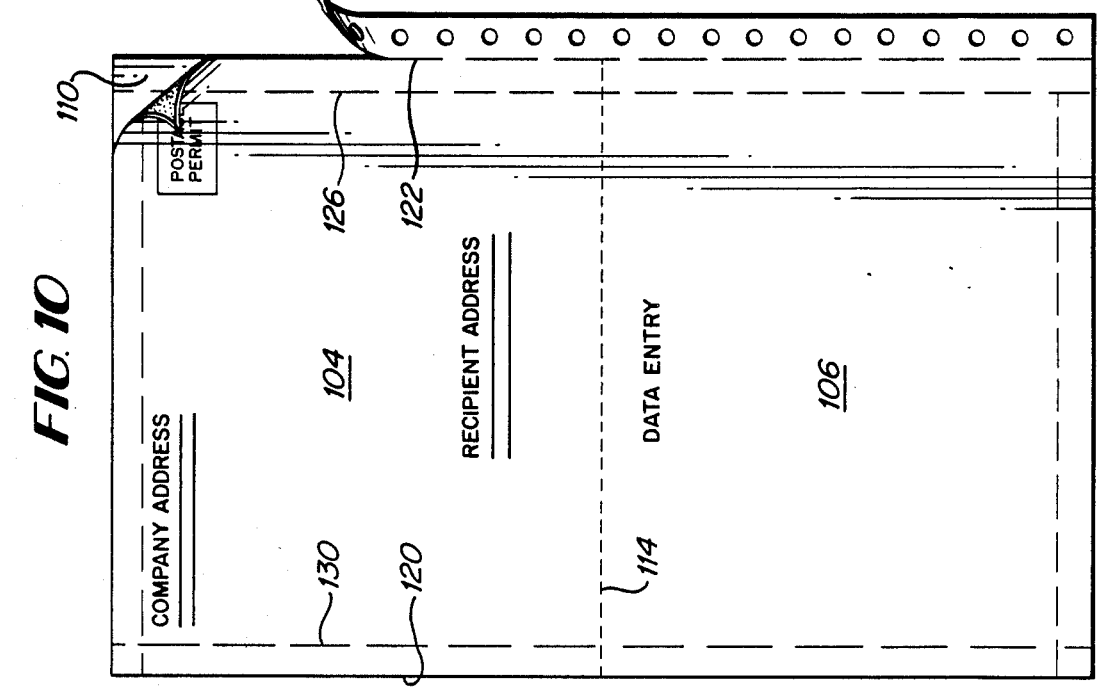

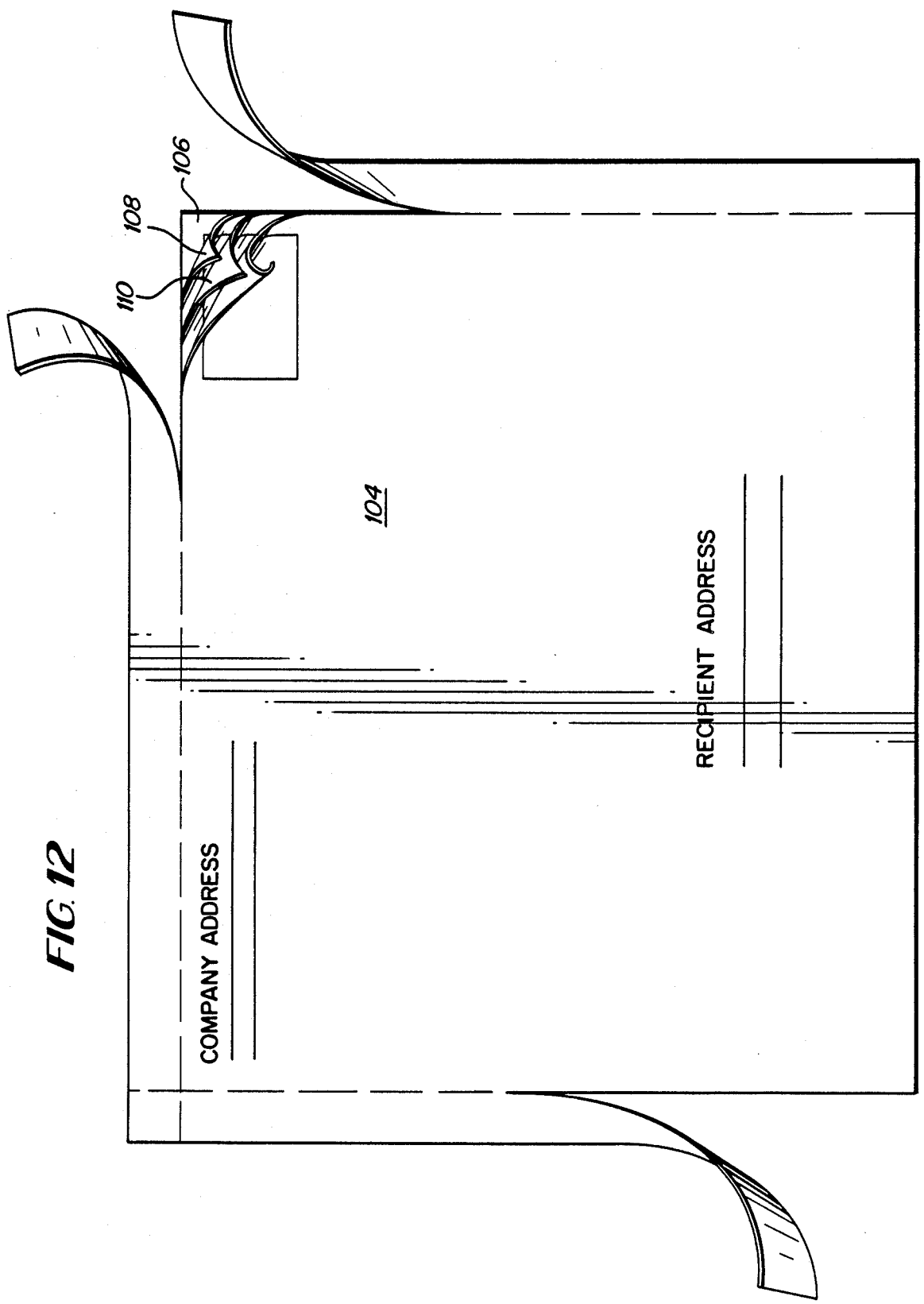

MAILER

RELATED APPLICATIONS

This application is a continuation-in-part of U.S. patent application Ser. No. 911,425, filed Sept. 25, 1986, entitled "Envelope" now abandoned.

BACKGROUND OF THE INVENTION

The present invention pertains to mailers and particularly to mailers of a type readily enabling computer generated message and address information to be printed on a single paper ply which can be folded to form a self-contained multi-ply mailer. The mailer may have either a die-cut window for viewing the address information through the window when the paper ply is folded or be configured so that, when folded, address information is positioned for view without use of a die-cut window.

It is now quite common for mailers to be manufactured in automatic equipment, including means for so-called variable printing of names, addresses and other information under computer control. Many of these mailers, essentially envelopes, have a window for viewing the outgoing address which has been printed on an underlying panel in an area designed to lie within the confines of the window. Mailers are also designed to have inserts included therein, but inserts have created problems, for example, by moving into the adress area and obscuring the view of the address information through the window. However, many customers prefer the use of die-cut windows for their mailings. Consequently, one of the problems associated with mailers using die-cut windows is to so locate the insert in the mailer such that the insert may not be physically able to obscure the viewing of the address information through the die-cut window.

From the standpoint of customer preference, as well as ease of printing computer-generated variable information on the mailer, the die-cut window is oftentimes not desirable. For example, a customer's computer printout program or data entry requirements may not conform to the placement of the die-cut window on the mailer. Many customers require variable return addresses and these requirements often require two die-cut windows which, again, may not meet the printout or data entry requirements of the customer. Two die-cut windows also reduces available space on the mailer for substantive messages and the like. Also, certain printers may not accommodate forms with die-cut patched windows. Consequently, there is also a need for a single-ply mailer on which computer-generated variable information may be printed such that the ply, when folded to form the mailer, may display address information. It is also desirable in such mailers to conceal the computer-generated information, i.e., the substantive message part, within the mailer. This type of mailer should also be capable of receiving an insert.

SUMMARY OF THE INVENTION

According to the present invention, and where a die-cut window for a mailer is preferred, a single-ply form with a patched die-cut window and vertical perforation is provided. The outgoing address may be imaged on one side of the form and to one side of a foldline such that when the form is folded over during a bursting operation, the address will appear through the die-cut window. In a second operation, the form is buckle-folded into mailing size along a generally orthogonally related foldline and an insert may be disposed into this fold in a position so that it is physically unable to move into the address area. Consequently, computer-generated variable information may be printed on the form prior to folding and the form may then be twice-folded to form a mailer, with the address information appearing through the die-cut window. This assures that the insert will not be capable of obscuring address information displayed through the window.

In a further embodiment, a separate ply of paper may be secured to the folded-over portion of the single-ply paper, with address information thereon such that the address information appears through the die-cut window and the two-ply portion of the form forms a return envelope, with return address information on the opposite side.

In a still further form of the present invention where a die-cut window is not preferred or desired, there is provided a single-ply form divided into panels, preferably quadrants, by orthogonally related foldlines. Computer-generated substantive information may be printed on the face of a set of the panels, for example, on the left side of a foldline, and the outgoing address may be printed on one of the panels onthe opposite side of the foldline. After printing, the single ply is folded backward onto itself along a vertical foldline substantially medially of the form's width, such that the outgoing address information lies in opposite orientation to the panels containing the substantive information. After removing the marginal feed strips, the forms are buckle-folded along the aligned second foldline portions located medially of the depth of the form such that the substantive information is concealed and the outgoing address is exposed on one face of the mailer. An insert can also be disposed within the mailer during the folding operation. Once folded, the mailer is disposed in a heat sealing machine to secure the edges of the now four-ply mailer.

In a preferred embodiment of the present invention, there is provided an article constituting a combined outgoing and return envelope with an insert nested in the outgoing envelope comprising a first sheet of given horizontal and vertical dimensions. This first sheet has a first foldline parallel to and between the horizontal end edges thereby providing first and second parts of the first sheet and a second foldline perpendicular to the first foldline, with a window in one of the parts of the first sheet. A second sheet overlies the second part of the first sheet and lines of adhesive secure the second sheet to the first sheet along the outer edges of the second sheet to provide a top openable return envelope, with lines of adhesive along the outer edges of the top surface of the first part of the first sheet and lines of adhesive on the bottom surface of the second part of the first sheet along the upper and lower edges and along a line adjacent the aforesaid foldline. This arrangement is such that the first part of the first sheet may be folded along the foldline to overlie the second sheet and then the sheets folded again along a second foldline perpendicular to the first foldline to provide a compartment of the combined outgoing and return envelopes in which the insert is nested whereby the insert is prevented by the second foldline from moving to the window and obscuring the view of an address through the window.

In a still further preferred embodiment hereof, there is provided a mailer comprising a generally rectilinear sheet of material having respective orthogonally related edges. First and second foldlines extend in the sheet generally perpendicular one to the other, generally parallel to the first and second edges, respectively, and defining first and second panels and third and fourth panels of the sheet, respectively, on opposite sides of the first foldline, the fourth and first panels and second and third panels, respectively, lying on opposite sides of the second foldline. First lines of adhesive are provided along the edges of the sheet on one face thereof such that, when the sheet is folded about the first foldline to register the first and fourth panels one with the other and the second and third panels one with the other and to register portions of the second foldline each with the other, the corresponding edges of the folded sheet may be secured one to the other, with second lines of adhesive along the edges of the face of the sheet opposite one face such that the registering first and fourth panels and second and third panels may be folded about the registering second foldline portions and secured one to the other along such edges whereby at least a four-ply mailer may be formed.

Accordingly, it is a primary object of the present invention to provide a novel and improved mailer for use with printers using computer-generated variable information.

These and further objects and advantages of the present invention will become more apparent upon reference to the following specification, appended claims and drawings.

BRIEF DESCRIPTION OF THE DRAWING FIGURES

FIG. 1, pertaining to a first embodiment, is a plan view of a first sheet from which a mailer may be made according to the present invention, with an overlaid second sheet and a strip of removable protective material;

FIG. 10 is a view of the mailer of FIG. 8 with the righthand portion folded backwards and illustrating the front side of the righthand portion;

FIG. 11 is a view of the four-ply mailer folded about the horizontal foldline ready for mailing;

Figure 1:
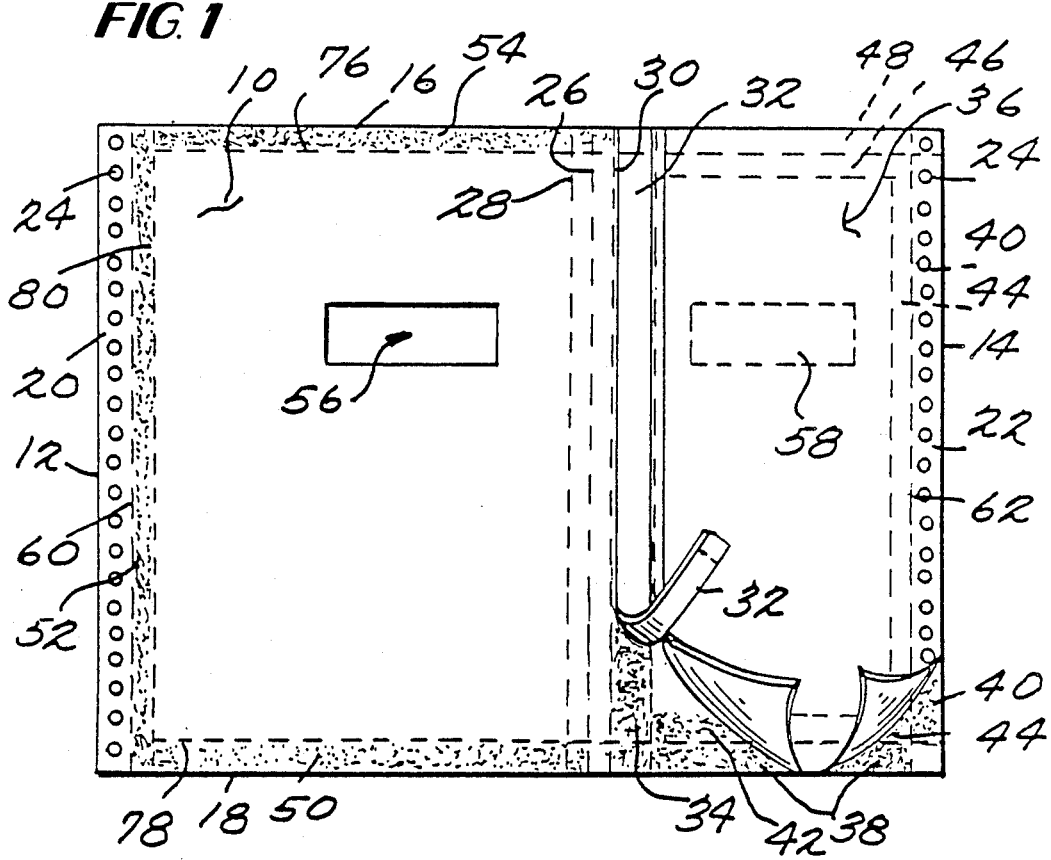

FIGS. 11a and 11b are cross-sectional views thereof, prior to the margins being heat-sealed, taken generally about on lines 11a and 11b in FIG. 11; and FIG. 12 is an enlarged plan view of the mailer as received by the recipient illustrating its various plies and the marginal tear strips.

DETAILED DESCRIPTION OF THE DRAWING FIGURES

Reference will now be made in detail to a present preferred embodiment of the invention, an example of which is illustrated in the accompanying drawings.

In the first embodiment, a first sheet 10 extends horizontally from left edge 12 to right edge 14 and vertically from top edge 16 to bottom edge 18. Marginal strips 20 and 22 may be disposed along edges 12 and 14, each provided with tractor holes 24, to facilitate manufacture in customary printing and adhesive applicator machinery (not shown) and to facilitate continuous feeding through computer output printers. It will be appreciated that the sheet 10 comprises one of a plurality of such sheets joined one to the other by horizontal lines of perforations along edges 16 and 18 such that the sheets 10 form part of a continuous business form.

Approximately two-thirds of the distance from edge 12 a vertical foldline 26 is provided, which may be perforated to facilitate folding at this point. A perforated line of weakening 28 is provided to the left of line 26. Where a return envelope is provided as illustrated, another perforated line of weakening 30 to the right of line 26 is provided. Immediately to the right of line 30, a removable protective strip 32 is provided, which overlies a line of reusable adhesive 34. A second sheet 36 overlies the righthand area of sheet 10, between the protective strip 32 and edge 14 to form the return envelope. Sheet 36 is permanently held to sheet 10 by lines of permanent type adhesive 38, 40, 42, 44, 46 and 48.

Still referring to FIG. 1, lines of heat settable adhesive are available for use as the sheet 10 is folded as explained below: these lines are 50, 52 and 54, running about the lefthand area of sheet 10 along its margins.

A window 56 is provided in the left area of sheet 10, positioned to align with an area 58 on the sheet 36 within which variable name and address information may be printed. At the appropriate time after computer printing, and before sealing (see below), the marginal tractor hole strips may be removed along lines 60 and 62.

Figure 2:
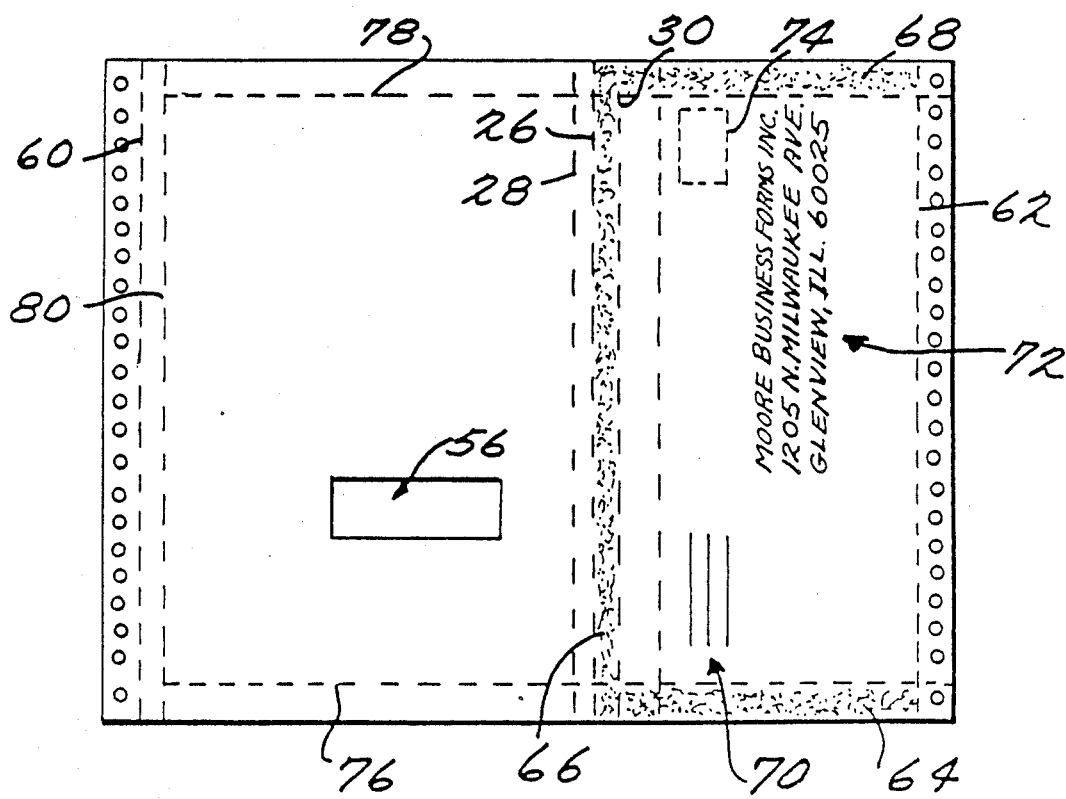
FIG. 2 is a plan view of the sheet of FIG. 1 but turned over top-to-bottom.

Now referring to FIG. 2, this shows the article of FIG. 1 turned over top-to-bottom. Here like features previously mentioned in FIG. 1 are correspondingly numbered. Additionally, heat settable adhesive lines 64, 66 and 68 are provided. Also, areas of what will become the front of the return envelope are shown: return address area 70, destination address area 72 and an area for postage 74.

Referring to both FIGS. 1 and 2, further perforated lines of weakening 76, 78 and 80 are provided, for a purpose described below.

Figure 3:
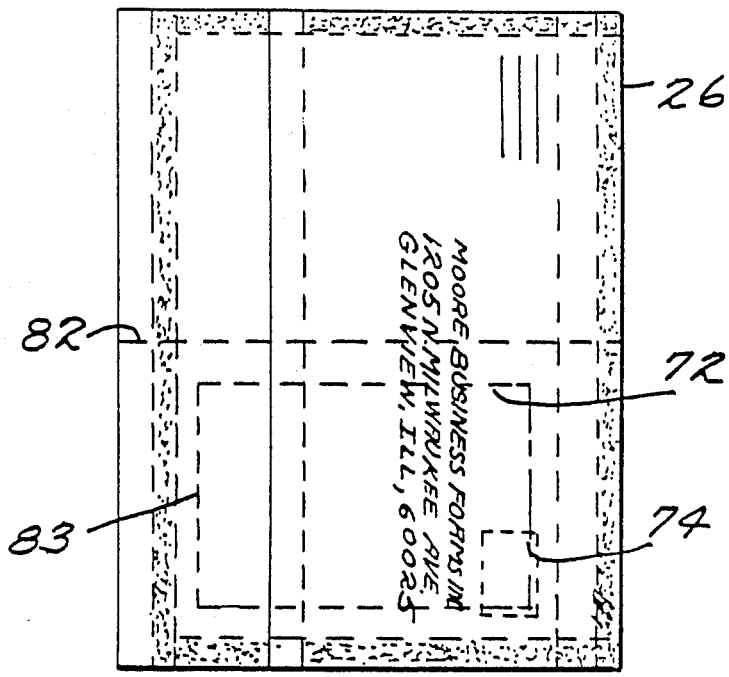
FIG. 3 is a view as in FIG. 1, but with the righthand side as shown in FIG. 1 folded over a portion of the lefthand side of FIG. 1.
Figure 4:
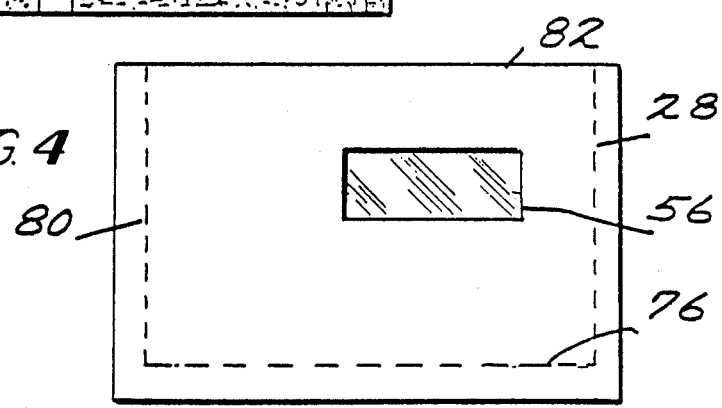
FIG. 4 is a view of the configuration of FIG. 3 after being folded downward from the top along a horizontal foldline midway of the height of the article as shown in FIG. 3.

FIG. 3 shows the article of FIGS. 1 and 2 after the righthand area of FIG. 1 has been folded over the lefthand area along foldline 26. FIG. 4 shows the article of FIG. 3 after the upper area of FIG. 3 has been folded down over the lower area along a foldline shown as 82 in FIG. 3. This fold now brings the window 56 into place to show the original addressee's address in the usual place on what is now an outgoing envelope ready for mailing—the heat settable adhesive lines having been heat set after the computer printing process.

It will be observed from the foregoing description that an insert indicated by chain line 83 placed below the line 82 will be captured by the fold 82 and therefore will be unable, after the folding step about line 82, to move to and obscure the view of the address area 58 through the window 56.

Figure 5:
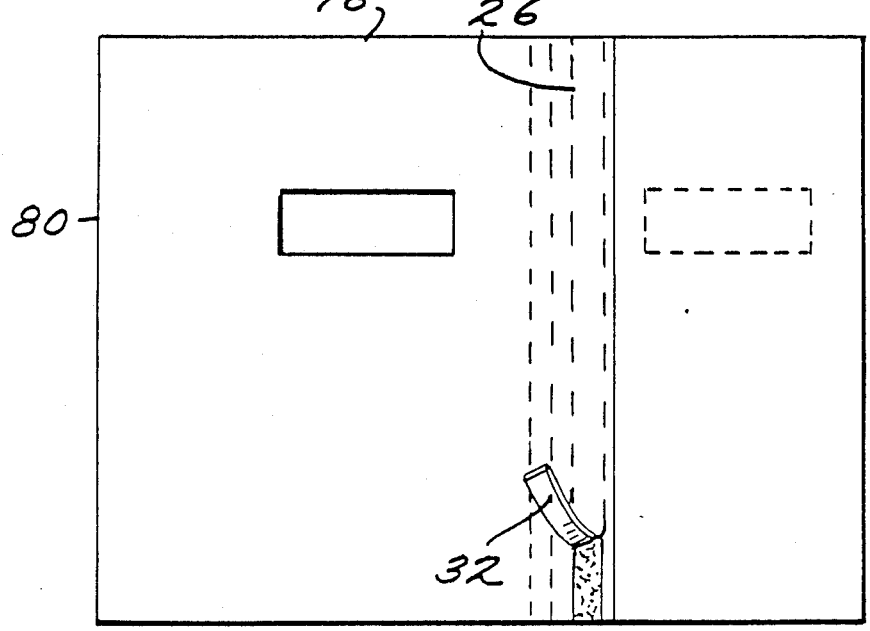
FIG. 5 is a view of the illustrative embodiment of FIGS. 1-4 after the mailer has been opened and is ready for removal and use of the return envelope.

The recipient of the outgoing envelope (FIG. 4) may now open it as follows: tearing off the right marginal strip along perforated line 28 (and aligned perforated line underneath); tearing off the bottom marginal strip along perforated line 76 (and aligned perforated lines underneath), and tearing along perforated line 80 (with an aligned length of line 80 underneath). The thusly opened envelope may then be laid out as shown in FIG. 5. At this point, the return envelope may be separated from the rest of the article along perforation line 26. Any desired insert may then be placed in the return envelope, the protective strip 32 peeled off, and the reusable adhesive strip 34 folded over as the closure flap of the return envelope. The latter is then ready for mailing to the address shown on the front of the return envelope (area 72 in FIG. 2).

The embodiment of FIGS. 1–5 may be modified with respect to the adhesive 34. Instead of employing a reusable adhesive a rewettable glue or a pressure seal adhesive may be used. The protective strip 32 would not be required with the rewettable adhesive, but would be preferred for use with the pressure seal adhesive.

Figure 6:
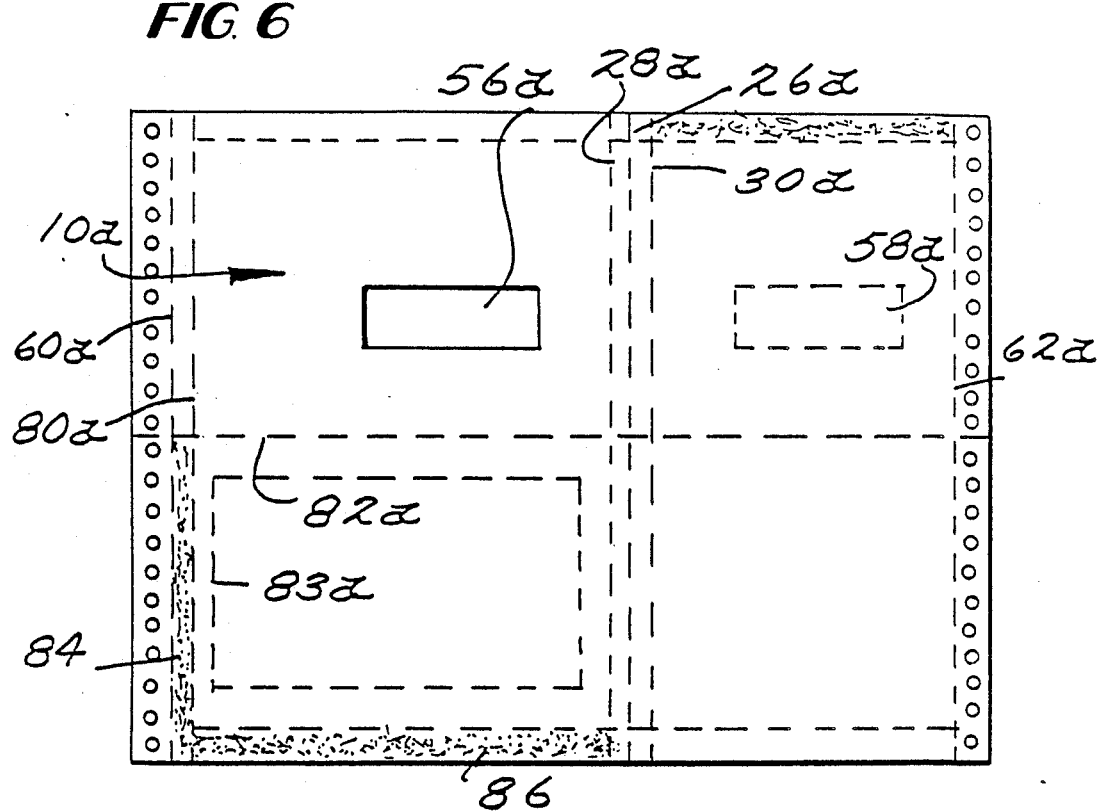
FIG. 6 is a plan view of a sheet of a second embodiment hereof.
Figure 7:
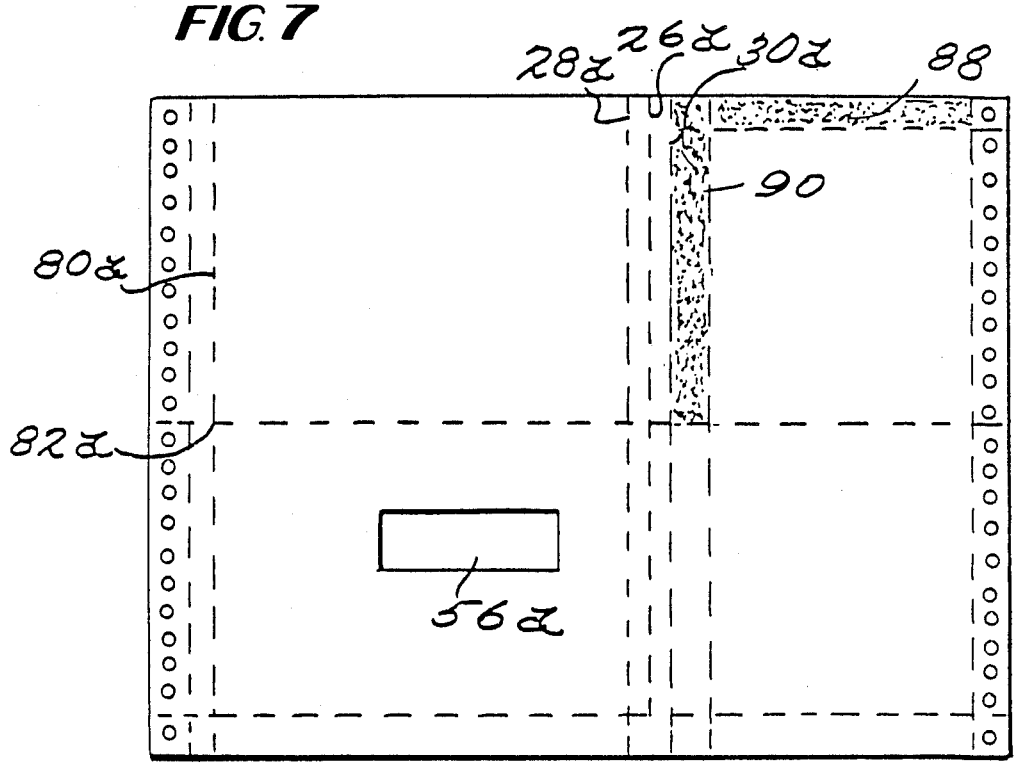
FIG. 7 is a plan view of the sheet of FIG. 6 but turned over top-to-bottom.

Another embodiment of the invention is shown in FIGS. 6 and 7. This embodiment includes the basic features of the first embodiment, except that the return envelope is dispensed with. Corresponding features are marked with the same reference characters, except followed by the letter "a". In FIGS. 6 and 7, vertical foldline 26a and horizontal foldline 82a are provided, along with perforated lines 28a and 30a. An address may be printed in area 58a to show through window 56a when the sheet 10a is folded along line 26a. Then, as the case with the first embodiment, a second fold along line 82a provides an outgoing envelope. Lines of glue 84 and 86 (FIG. 6) may be provided on the top side of sheet 10a and lines of glue 88 and 90 (FIG. 7) may be provided on the reverse side of sheet 10a to affix the parts together to form the final envelope. Again, as in the first embodiment, an insert 83a placed in the envelope below the foldline 82a (as viewed in FIG. 6) will not be able to move to and obscure the view of the address area 58a through the window 56a.

Figure 8:
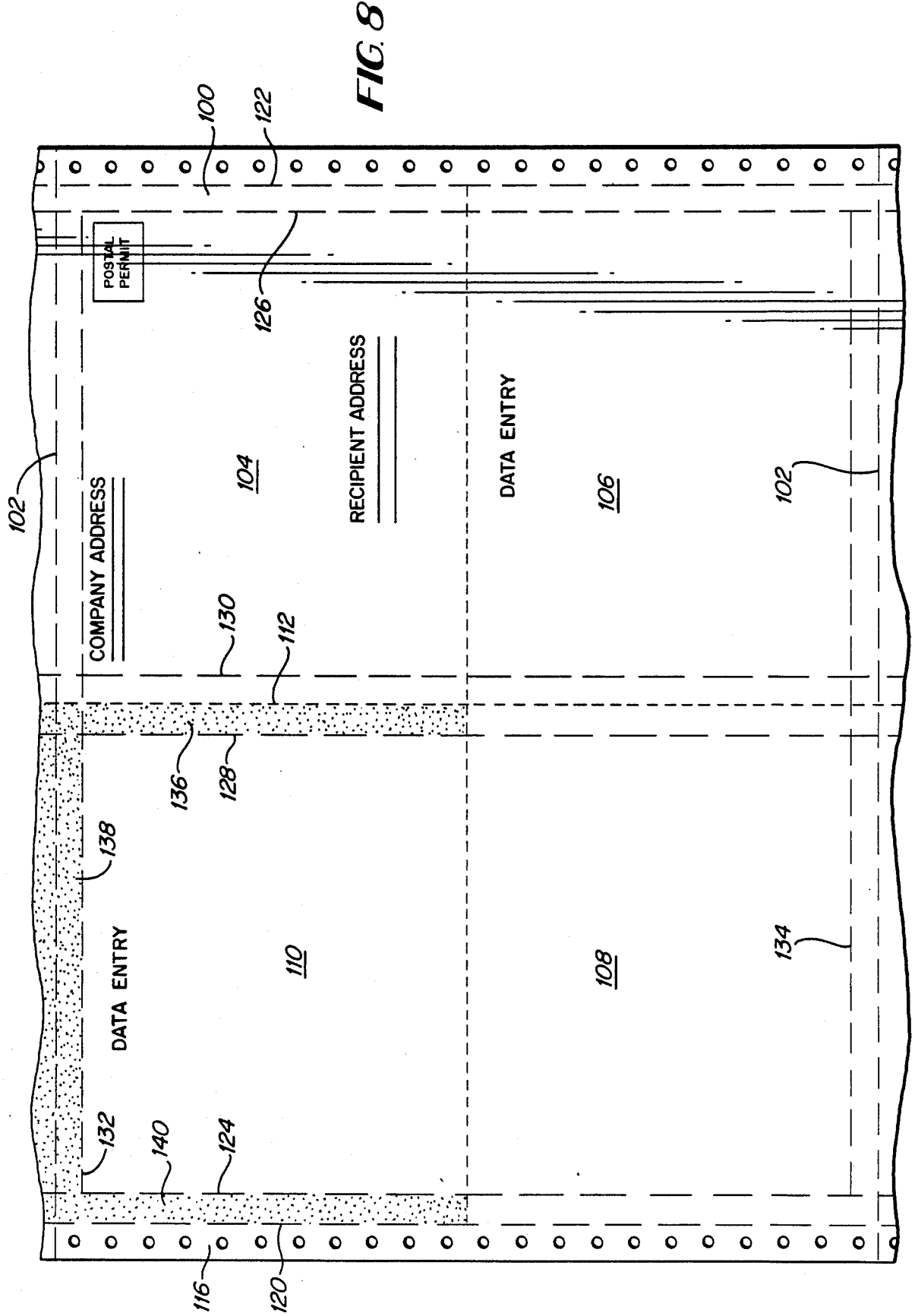
FIG. 8 is a plan view of a still further embodiment of mailer constructed in accordance with the present invention, illustrating the mailer as part of a continuous business form.

Turning now to the embodiment hereof illustrated in FIGS. 8–12, there is provided a single-ply paper form 100 which comprises one of a plurality of such forms in a continuous business form, the additional forms being illustrated adjacent opposite ends of form 100 and connected thereto by the lines of perforations 102. In this embodiment, form 100 is divided into first, second, third and fourth panels, preferably quadrants, 104, 106, 108 and 110, respectively, by a pair of orthogonally related foldlines 112 and 114. Particularly, the foldline 112 extends vertically substantially medially of form 100 as illustrated in FIG. 8 while the foldline 114 extends horizontally substantially medially between and parallel to the lines of perforation 102 in FIG. 8. Consequently, the first and second panels 104 and 106 lie on opposite sides of the foldline 112 from the third and fourth panels 108 and 110. Also, the fourth and first panels 110 and 104 lie on opposite sides of the foldline 114 from the second and third panels 106 and 108, respectively.

Figure 9:
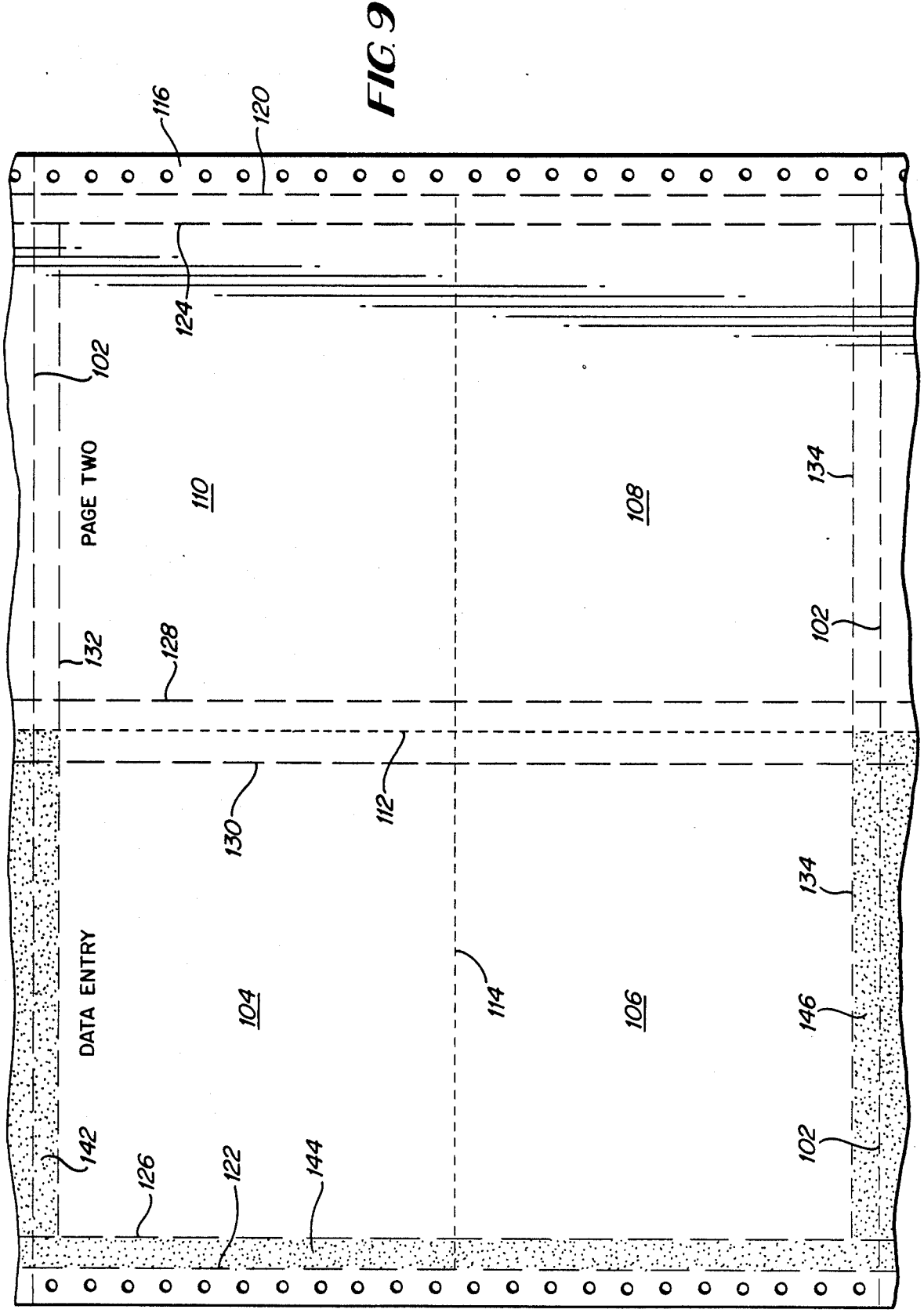
FIG. 9 is a plan view of the reverse side of the mailer of FIG. 8 turned left-to-right.

As illustrated in FIGS. 8 and 9, the first panel 104 on one face of the sheet may be provided with address information, for example, the address of the recipient, and the return address of the entity mailing the mailer. The remaining panels may be employed for data entry, although it will be appreciated that panel 106 in FIG. 8 will be exposed to view in the final form of the mailer, whereas data entered on panels 108 and 110, as illustrated in FIG. 8, would be hidden from view in the final form of the mailer. The panels of the opposite side of the sheet illustrated in FIG. 9 may also be used for data entry purposes.

Referring now to FIG. 8, marginal feed strips 116 and 118 are provided along opposite edges of form 100 and have tractor openings whereby the form may be used in printers. The marginal feed strips 116 and 118 are connected to the form 100 along marginal lines of perforations 120 and 122, respectively. Additionally, lines of perforations 124 and 126, respectively, are inset from lines of perforations 120 and 122, respectively. Vertically extending lines of perforations 128 and 130 are also provided adjacent the foldline 112. Horizontal lines of perforations 132 and 134 are also provided form 100 inset from the separation lines of perforations 102. A heat-activated, permanent-type adhesive is disposed along three sides of the margins of the form in the fourth panel 110. Particularly, a line of adhesive 136 is provided between foldline 112 and perforation line 128. A line of adhesive 138 is provided between the separation line of perforations 102 and perforation line 132. Finally, a line of adhesive 140 is provided between marginal line of perforations 120 and perforation line 124. It will be appreciated that panel 104 may be provided with adhesive in the same orientation as the lines of adhesive are applied to panel 110 in lieu of such adhesive in panel 110, as will become apparent from the ensuing description.

Turning now to FIG. 9, on the reverse sides of panels 104, 106, lines of adhesive are provided along the outer edges thereof. Particularly, a line of adhesive 142 is provided between the separation line of perforations 102 and perforation line 132 in panel 104. A line of adhesive 144 is provided along the edges of both panels 104 and 106 between the perforation lines 122 and 126. A final line of adhesive 146 is provided in panel 106 between the perforation lines 102 and 134.

To fold the sheet 100 into a mailer in accordance with the present invention, the righthand portion illustrated in FIG. 8, including panels 104 and 106, are folded backwardly about the foldline 112 such that the lines of adhesive thereof on the opposite side, i.e., adhesive lines 142, 144 and 146, register with corresponding marginal strips along the edges of panels 110 and 108. The result of the first fold about foldline 112 is illustrated in FIG. 10, wherein panels 108 and 110 lie behind panels 106 and 104, respectively. By such folding, it will be appreciated that the lines of perforations register one with the other, enabling the tear strips to be removed.

By folding the two-ply sheet illustrated in FIG. 10 along the registering portions of foldline 114 such that panels 106 and 108 are folded backwardly, a mailer, as illustrated in FIG. 11, is provided. Note that the recipient's address on the face of panel 104 is exposed to view. Also, when this final folding occurs about foldline 114, the adhesive strips 136, 138 and 140 register with the margins of the panel 108. By passing the folded mailer through a heat sealer, the adhesive is activated, whereby the various panels are secured about each of the three marginal edges of the mailer to close the mailer. When the fold about the second foldline 114 is made, it is possible to insert between panels 108 and 110, one or more inserts. Thus, upon sealing the mailer, the insert is captured within the adhesive margins of the mailer and the foldline 114.

Referring now to FIG. 12, the mailer, when received by the recipient, may be torn along the margins inset from the adhesive strips such that the mailer may be opened about foldline 114. The insert, if any, may then be removed and consequently, two sheets of the form are available and separated one from the other, i.e., the sheets containing panels 104 and 106 and the sheet containing panels 108 and 110.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mailer comprising:
   a generally rectilinear sheet of material having respective orthogonally related edges;
   first and second foldlines extending in said sheet generally perpendicular one to the other, generally parallel to said orthogonally related edges, respectively, and defining first and second panels and third and fourth panels of said sheet, respectively, on opposite sides of said first foldline, said fourth and first panels and said second and third panels, respectively, lying on opposite sides of said second foldline;
   first lines of adhesive along the edges of said sheet on one face thereof such that, when said sheet is folded about said first foldline to register the first and fourth panels one with the other and the second and third panels one with the other and to register portions of the second foldline each with the other, the corresponding edges of the folded sheet may be secured one to the other;
   second lines of adhesive along edges of the face of said sheet opposite said one face such that, when the registering first and fourth panels and said second and third panels are folded about the registering second foldline portions, the corresponding edges of said fourth and third panels may be secured one to the other therealong whereby at least a four-ply mailer may be formed; and
   lines of perforations extending along the margins of said sheet inset from said edges thereof and generally parallel thereto, said marginal lines of perforations registering one with the other when said sheet is folded about said first foldline, the registering marginal lines of perforations of said first and fourth panels lying in registration with the registering marginal lines of perforations of said second and third panels when said sheet is folded about said second foldline to form marginal tear strips about two sides of the mailer, additional lines of perforations on opposite sides of and adjacent to said first foldline and extending parallel thereto, said additional lines of perforations being registerable one with the other when said sheet is folded about said first foldline, the registering additional lines of perforations of said first and fourth panels lying in registration with the registering additional lines of perforations of the second and third panels when said sheet is folded about said second foldline to form an additional marginal tear strip along another side of said mailer whereby the marginal tear strips may be removed and the mailer opened, said second lines of adhesive extending about the edges of one of said third and fourth panels coincident with the corresponding edges of said sheet and also about a margin of one of said third and fourth panels adjacent said first foldline, the registering marginal lines of perforations of said first and fourth panels and said second and third panels being inset from said first lines of adhesive and a portion of said second lines of adhesive when said sheet is folded to form said four-ply mailer and the registering additional lines of perforations of said first and fourth panels and said second and third panels being inset from the remaining portion of said second lines of adhesive when said sheet is folded to form said four-ply mailer.

2. A mailer according to claim 1 wherein said first lines of adhesive extend about the edges of said first and second panels coincident with the corresponding edges of said sheet.

3. A mailer comprising:
   a generally rectilinear sheet of material having respective orthogonally related edges;
   first and second foldlines extending in said sheet generally perpendicular one to the other, generally parallel to said orthogonally related edges, respectively, and defining first and second panels and third and fourth panels of said sheet, respectively, on opposite sides of said first foldline, said fourth and first panels and said second and third panels, respectively, lying on opposite sides of said second foldline;
   first lines of adhesive along the edges of said sheet on one face thereof such that, when said sheet is folded about said first foldline to register the first and fourth panels one with the other and the second and third panels one with the other and to register portions of the second foldline each with the other, the corresponding edges of the folded sheet may be secured one to the other;
   second lines of adhesive along edges of the face of said sheet opposite said one face such that, when the registering first and fourth panels and said second and third panels are folded about the registering second foldline portions, the corresponding edges of said fourth and third panels may be secured one to the other therealong whereby at least a four-ply mailer may be formed;
   an insert disposable between one of said first and fourth panels and said second and third panels when said sheet is folded about said first foldline;
   lines of perforations extending along the margins of said sheet inset from said edges thereof and generally parallel thereto, said marginal lines of perforations registering one with the other when said sheet is folded about said first foldline, the registering marginal lines of perforations of said first and fourth panels lying in registration with the registering marginal lines of perforations of said second and third panels when said sheet is folded about said second foldline to form marginal tear strips about two sides of the mailer, additional lines of perforations on opposite sides of and adjacent to said first foldline and extending parallel thereto, said additional lines of perforations being registerable one with the other when said sheet is folded about said first foldline, the registering additional lines of perforations of said first and fourth panels lying in registration with the registering additional lines of perforations of the second and third panels when said sheet is folded about said second foldline to form an additional marginal tear strip along another side of said mailer whereby the marginal tear strips may be removed and the mailer opened; said second lines of adhesive extending about the edges of one of said third and fourth panels coincident with the corresponding edges of said sheet and also about a margin of one of said third and fourth panels adjacent said first foldline;

the registering marginal lines of perforations of said first and fourth panels and said second and third panels being inset from said first lines of adhesive and a portion of said second lines of adhesive when said sheet is folded to form said four-ply mailer and the registering additional lines of perforations of said first and fourth panels and said second and third panels being inset from the remaining portion of said second lines of adhesive when said sheet is folded to form said four-ply mailer; and marginal tear strips along opposite sides of said elongated sheet and having a plurality of longitudinally spaced openings spaced one from the other therealong, said marginal tear strips being secured to said panels by lines of perforations disposed laterally outwardly of the respective lines of adhesive.

4. A mailer according to claim 3 wherein said first lines of adhesive extend about the edges of said first and second panels coincident with the corresponding edges of said sheet.

5. A single-ply continuous business form separable to provide a plurality of mailers comprising:

an elongated sheet of material having a plurality of transversely extending lines of perforations spaced longitudinally one from the other to define a plurality of rectilinear sheets separable one from the other;

each rectilinear sheet of material having respective orthogonally related edges;

first and second foldlines extending in each said sheet generally perpendicular one to the other, generally parallel to said orthogonally related edges, respectively, and defining first and second panels and third and fourth panels of said rectilinear sheet, respectively, on opposite sides of said first foldline, said fourth and first panels and said second and third panels, respectively, lying on opposite sides of said second foldline;

first lines of adhesive along the edges of each said rectilinear sheet on one face thereof such that, when said sheet is folded about said first foldline to register the first and fourth panels one with the other and the second and third panels one with the other and to register portions of the second foldline each with the other, the corresponding edges of the folded rectilinear sheet may be secured one to the other;

second lines of adhesive along edges of the face of each said rectilinear sheet opposite said one face such that, when the registering first and fourth panels and said second and third panels are folded about the registering second foldline portions, the corresponding edges of said fourth and third panels may be secured one to the other therealong whereby at least a four-ply mailer may be formed;

a pair of marginal tear strips disposed along the opposite edges of said elongated sheet outwardly of the edges of said rectilinear sheets and having tractor holes therein longitudinally spaced one from the other; and lines of perforations extending along the margins of said rectilinear sheet inset from said edges thereof and generally parallel thereto, said marginal lines of perforations registering one with the other when said rectilinear sheet is folded about said first foldline, the registering marginal lines of perforations of said first and fourth panels lying in registration with the registering marginal lines of perforations of said second and third panels when said rectilinear sheet is folded about said second foldline to form marginal tear strips about two sides of the mailer, additional lines of perforations on opposite sides of and adjacent to said first foldline and extending parallel thereto, said additional lines of perforations being registerable one with the other when said rectilinear sheet is folded about said first foldline, the registering additional lines of perforations of said first and fourth panels lying in registration with the registering additional lines of perforations of the second and third panels when said sheet is folded about said second foldline to form an additional marginal tear strip along another side of said mailer whereby the marginal tear strips may be removed and the mailer opened, and wherein, in each rectilinear sheet, said second lines of adhesive extend about the edges of one of said third and fourth panels coincident with the corresponding edges of said rectilinear sheet and also about a margin of one of said third and fourth panels adjacent said first foldline, said registering marginal lines of perforations of said first and fourth panels and said second and third panels being inset from said first lines of adhesive and a portion of said second lines of adhesive when said sheet is folded to form said four-ply mailer, the registering additional lines of perforations of said first and fourth panels and said second and third panels being inset from the remaining portion of said second lines of adhesive when said sheet is folded to form said four-ply mailer.

6. A mailer according to claim 5 wherein, in each rectilinear sheet, said first lines of adhesive extend about the edges of said first and second panels coincident with the corresponding edges of said rectilinear sheet.

* * * * *